(12) United States Patent (10) Patent No.: US 12,493,511 B2
Cudak et al. (45) Date of Patent: Dec. 9, 2025

(54) CO-TENANT ALERT APPARATUS, SYSTEM, AND METHOD

(71) Applicant: Lenovo Enterprise Solutions (Singapore) Pte. Ltd., New Tech Park (SG)

(72) Inventors: Gary D. Cudak, Raleigh, NC (US); Pravin S. Patel, Cary, NC (US); James Parsonese, Cary, NC (US); Michael J. Biersack, Cary, NC (US); Mehul Shah, Austin, TX (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 99 days.

(21) Appl. No.: 18/596,226

(22) Filed: Mar. 5, 2024

(65) Prior Publication Data

US 2025/0284580 A1 Sep. 11, 2025

(51) Int. Cl.
*G06F 11/07* (2006.01)

(52) U.S. Cl.
CPC ...... *G06F 11/0784* (2013.01); *G06F 11/0712* (2013.01); *G06F 11/0793* (2013.01)

(58) Field of Classification Search
CPC ............ G06F 11/0712; G06F 11/0781; G06F 11/0784; G06F 11/079; G06F 11/0793; G06F 11/301; G06F 9/45533
See application file for complete search history.

(56) References Cited

U.S. PATENT DOCUMENTS

| | | | | |
|---|---|---|---|---|
| 2003/0056155 A1* | 3/2003 | Austen | ................ | G06F 11/0781 714/45 |
| 2010/0011257 A1* | 1/2010 | Murakami | .......... | G06F 11/0772 714/48 |
| 2011/0154128 A1* | 6/2011 | Rajkumari | .......... | G06F 11/0709 714/48 |
| 2013/0152082 A1* | 6/2013 | Ahrens | ............... | G06F 11/0781 718/1 |
| 2023/0004432 A1* | 1/2023 | Wilding | .............. | G06F 11/3438 |

* cited by examiner

*Primary Examiner* — Gabriel Chu
(74) *Attorney, Agent, or Firm* — Kunzler Bean & Adamson; Bruce R. Needham (57) ABSTRACT

A method is disclosed for alerting a co-tenant of a fault in a partitioned system. An apparatus and system also perform the functions of the method. The method includes monitoring, for faults, two or more partitions in a system sharing a management controller where each of the partitions is associated with a tenant. The method includes detecting a fault on a first partition and identifying an alert class of multiple alert classes for the fault. The method includes identifying the alert class of the fault as a high-level alert class indicating that the fault affects one or more other partitions different than the first partition. The method includes notifying the tenant of the first partition and each tenant of the one or more other partitions of the fault in response to the alert class being the high-level alert class.

20 Claims, 8 Drawing Sheets

CO-TENANT ALERT APPARATUS, SYSTEM, AND METHOD

FIELD

The subject matter disclosed herein relates to managing computing systems and more particularly relates to managing partitioned computing systems.

BACKGROUND

In contemporary computing systems, partitioning is a commonly employed technique to enhance reliability, security, and overall system efficiency. Partitioned systems consist of two or more partitions, each operating independently and serving specific functions within the broader system. These partitions may run on the same processor or on distinct processors, depending on the system architecture.

While partitioning provides numerous advantages, it also introduces challenges related to fault detection and response. In a partitioned system, faults or errors occurring in one partition have the potential to impact other partitions. Therefore, there is a need for an effective mechanism to detect fault events in one partition and promptly alert the processor associated with another partition.

BRIEF SUMMARY

A method is disclosed for alerting a co-tenant of a fault in a partitioned system. An apparatus and system also perform the functions of the method. The method includes monitoring, for faults, two or more partitions in a system sharing a management controller where each of the partitions is associated with a tenant. The method includes detecting a fault on a first partition and identifying an alert class of multiple alert classes for the fault. The method includes identifying the alert class of the fault as a high-level alert class indicating that the fault affects one or more other partitions different than the first partition. The method includes notifying the tenant of the first partition and each tenant of the one or more other partitions of the fault in response to the alert class being the high-level alert class.

According to another aspect of the disclosure, an apparatus includes one or more processors and a non-transitory computer readable storage media storing code. The code is executable by the one or more processors to perform operations including monitoring, for faults, each of two or more partitions in a system sharing a management controller. Each of the one or more partitions is associated with a tenant. The operations further include detecting a fault on a first partition of the two or more partitions and identifying an alert class of multiple alert classes for the fault. The operations include identifying that the alert class of the fault is a high-level alert class where the high-level alert class indicates that the fault affects one or more of the two or more partitions different than the first partition. The operations further include notifying the tenant of the first partition and each tenant of the one or more other partitions of the fault in response to the alert class being a high-level alert class.

According to another aspect of the present disclosure, a system includes a partitionable motherboard with two or more partitions and a management controller configured to communicate with the two or more partitions. The management controller is connected to tenants of the two or more partitions over a management network. The system includes one or more processors on the management controller and non-transitory computer readable storage media storing code. The code is executable by the one or more processors to perform operations including monitoring, for faults, each of two or more partitions in a system sharing a management controller where each of the two or more partitions is associated with a tenant. The operations further include detecting a fault on a first partition of the two or more partitions and identifying an alert class of multiple alert classes for the fault. The operations include identifying that the alert class of the fault is a high-level alert class, where the high-level alert class indicates that the fault affects one or more other partitions of the two or more partitions different than the first partition. The operations further include notifying the tenant of the first partition and each tenant of the one or more other partitions of the fault in response to the alert class being a high-level alert class.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

As previously discussed, existing solutions often fail to recognize and appropriately respond to faults that may impact more than one partition in a partitioned system. The present disclosure addresses this and other issues by introducing a novel method for detecting faults in a partitioned system and alerting a processor associated with a specific partition when the fault event is detected in another partition. This innovation ensures a proactive and efficient response to faults in a partitioned system, thereby minimizing an impact on system performance.

The method includes monitoring, for faults, two or more partitions in a system sharing a management controller, where each of the partitions is associated with a tenant. The method includes detecting a fault on a first partition and identifying an alert class of multiple alert classes for the fault. The method includes identifying the alert class of the fault as a high-level alert class indicating that the fault affects one or more other partitions different than the first partition. The method includes notifying the tenant of the first partition and each tenant of the one or more other partitions of the fault in response to the alert class being the high-level alert class.

In some embodiments, the high-level alert class includes multiple sub-classes. Each of the sub-classes is related to a response time within which a remediation action must be performed. The method may further include identifying an alert sub-class corresponding to the fault in response to identifying that the alert class of the fault is a high-level alert class.

In some embodiments, the method includes determining, based on the identified sub-class, a remediation action to be performed and/or timing of the remediation action. In some embodiments, the remediation action includes, for the first partition and the one or more other partitions, moving data, shedding load, refusing critical loads, and redirecting new data to a non-shared drive.

In some embodiments, the method further includes, based on the identified sub-class, immediately performing, at the first partition and/or the one or more other partitions, the remediation action associated with the sub-class. The method may include, based on the identified sub-class, scheduling, at the first partition and/or the one or more other partitions, the remediation action associated with the sub-class for a future time. In some embodiments, in response to the identified alert class including the sub-class for scheduling the remediation action at a future time and in response to detecting a second fault with an identified alert class comprising a high-level alert class, the method further includes changing the scheduled remediation to an earlier time.

In certain embodiments, the method further includes building a map of hardware components related to more than one of the two or more partitions. In some embodiments, identifying the alert class for the fault and identifying that the alert class is a high-level alert class further includes accessing information from the map to determine if a component related to the fault is related to more than one of the two or more partitions.

In some embodiments, notifying the tenants of the one or more other partitions includes communicating, over a management network, the fault to the tenants of the one or more other partitions via the management controller. In some embodiments, the management controller communicates with the tenants of the one or more other partitions via one of two or more sockets of a common motherboard.

According to another aspect of the disclosure, an apparatus includes one or more processors and a non-transitory computer readable storage media storing code. The code is executable by the one or more processors to perform operations including monitoring, for faults, each of two or more partitions in a system sharing a management controller. Each of the one or more partitions is associated with a tenant. The operations include detecting a fault on a first partition of the two or more partitions and identifying an alert class of multiple alert classes for the fault. The operations include identifying that the alert class of the fault is a high-level alert class where the high-level alert class indicates that the fault affects one or more of the two or more partitions different than the first partition. The operations further include notifying the tenant of the first partition and each tenant of the one or more other partitions of the fault in response to the alert class being a high-level alert class.

In some embodiments, the high-level alert class includes multiple sub-classes. Each sub-class may be related to a response time within which a remediation action must be performed. In some embodiments, the operations further include identifying an alert sub-class corresponding to the fault in response to identifying that the alert class of the fault is a high-level alert class. In certain embodiments, the operations further include determining, based on the identified sub-class, a remediation action to be performed and/or timing of the remediation action.

In some embodiments, the operations further include, based on the identified sub-class, immediately performing, at the first partition and/or the one or more other partitions, the remediation action associated with the sub-class. In some embodiments, the operations further include scheduling, at the first partition and/or the one or more other partitions, the remediation action associated with the sub-class for a future time. In certain embodiments, the operations further include, in response to the identified alert class including the sub-class for scheduling the remediation action at a future time and in response to detecting a second fault with an identified alert class including a high-level alert class, changing the scheduled remediation to an earlier time.

In some embodiments, the operations further include building a map of hardware components related to more than one of the two or more partitions. In some embodiments, identifying the alert class the fault and identifying that the alert class is a high-level alert class further include accessing information from the map to determine if a component related to the fault is related to more than one of the two or more partitions. In some embodiments, notifying the tenants of the one or more other partitions includes communicating, over a management network, the fault to the tenants of the one or more other partitions via the management controller.

According to another aspect of the present disclosure, a system includes a partitionable motherboard with two or more partitions and a management controller configured to communicate with the two or more partitions. The management controller is connected to tenants of the two or more partitions over a management network. The system includes one or more processors on the management controller and non-transitory computer readable storage media storing code. The code is executable by the one or more processors to perform operations including monitoring, for faults, each of two or more partitions in a system sharing a management controller where each of the two or more partitions is associated with a tenant. The operations further include detecting a fault on a first partition of the two or more partitions and identifying an alert class of multiple alert classes for the fault. The operations include identifying that the alert class of the fault is a high-level alert class, where the high-level alert class indicates that the fault affects one or more other partitions of the two or more partitions different than the first partition. The operations further include notifying the tenant of the first partition and each tenant of the one or more other partitions of the fault in response to the alert class being a high-level alert class.

In some embodiments, the high-level alert class includes multiple sub-classes. Each sub-class is related to a response time within which a remediation action must be performed. The operations further include identifying an alert sub-class corresponding to the fault in response to identifying that the alert class of the fault is a high-level alert class. In some embodiments, the operations include determining, based on the identified sub-class, a remediation action to be performed and/or timing of the remediation action.

Figure 1:
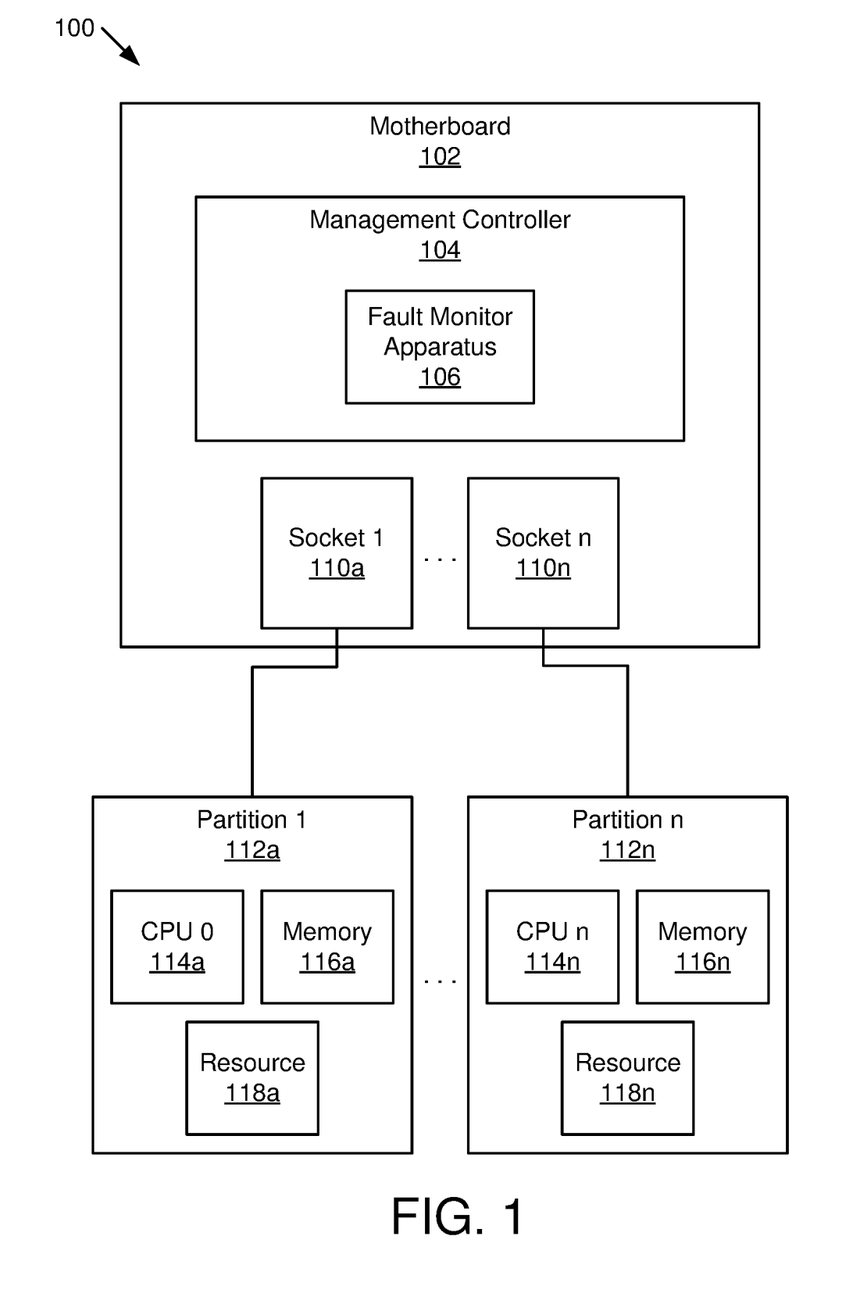
FIG. 1 is a schematic block diagram illustrating a system for monitoring two or more partitions for faults according to various embodiments.

FIG. 1 is a schematic block diagram illustrating a compute node 100 for detecting and appropriately responding to faults in a partitioned system, according to various embodiments. The compute node 100 includes a partitionable motherboard 102 having two or more partitions 112a-112n. In some embodiments, each partition 112a-112n corresponds to a unique tenant. In other embodiments, more than one of the partitions 112a-112n corresponds to the same tenant. In some examples, the compute node 100 is created by partitioning the motherboard 102 with multiple CPUs 114. In certain embodiments, each of the partitions 112a-112n runs a different instance of an operating system ("OS"). In these and other embodiments, at least one of the partitions 112a-112n may include one or more virtual partitions.

In some embodiments, the compute node 100 includes a management controller 104 configured to communicate with each of the partitions 112a-112n. The management controller 104, in some embodiments, is called a baseboard management controller ("BMC"). In some embodiments, the management controller 104 is an Xclarity® Controller ("XCC") by Lenovo®. In other embodiments, the management controller 104 is Management Engine ("ME") by Intel®. In other embodiments, the management controller 104 is another type by another manufacturer.

The management controller 104 is configured to communicate with a management server (not shown) over a management network. In some embodiments, the management server is an Xclarity Administrator ("XCA") by Lenovo. In some embodiments the management server is on-site with the compute node 100. In some embodiments, the management server is connected over a management network to an off-site management server. In some embodiments, the management network connecting the management controller 104 and the management server as well as the management network connecting the management server to the off-site management server are separate from another computer network serving the tenants of the partitions 112a-112n. In various embodiments, the off-site management server is an XCA or an Xclarity Orchestrator ("XCO") by Lenovo.

In some embodiments, the management controller 104 includes a fault monitor apparatus 106, as discussed in more detail below with reference to the apparatuses 400, 500 of FIGS. 4 and 5. In some embodiments, the management controller 104 is configured to communicate with the partitions 112a-112n via corresponding sockets 110a-110n. In other words, each partition 112a-112n may be connected to a corresponding socket 110a-110n. In some embodiments, one or more of the sockets 110a-110n is configured to direct input/output ("I/O") signals to or receive signals from an I/O device, such as an electronic display, a keyboard, a mouse, etc.

Each partition 112a-112n includes at least a central processing unit ("CPU") (labeled CPU 0 114a to CPU n 114n, generically or collectively "114"). Each of the partitions 112a-112n may also include any of a variety of additional components, such as memory (labeled memory 116a to memory 116n, generically or collectively "116") and/or other resources (labeled resource 118a to resource 118n, generically or collectively "118") such as a non-volatile storage device, a graphical processing unit ("GPU"), an accelerator, another processor, a field programmable gate array ("FPGA"), and the like. In some embodiments, two or more partitions 112a-112n share a storage device and/or other hardware components. For clarity, the partitions 112 are depicted separate from the sockets 110, however, the components, e.g., CPU 114, memory 116, resource 118, of the partitions 112 are plugged into the sockets 110.

Figure 2:
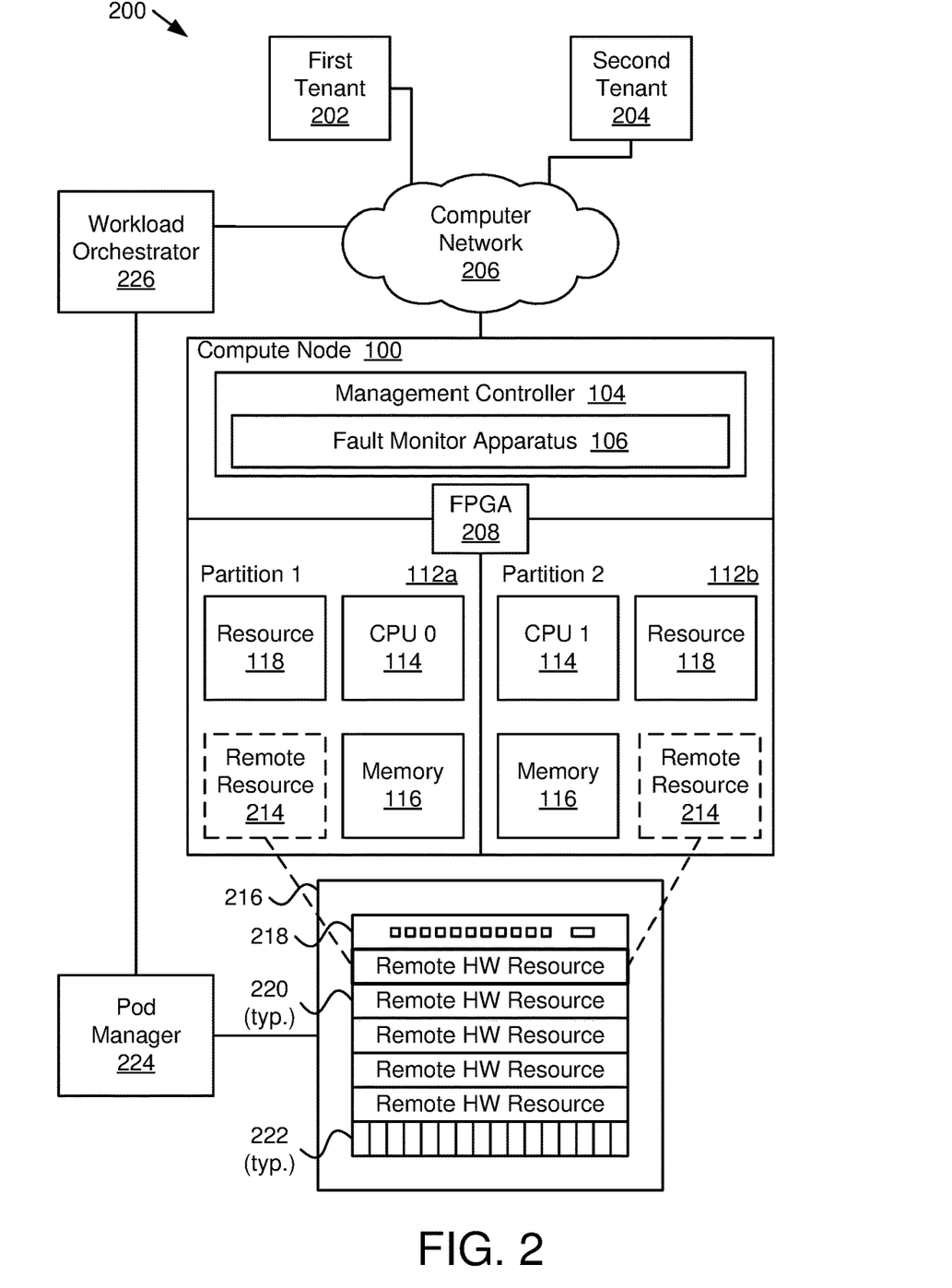
FIG. 2 is a schematic block diagram illustrating a system for detecting and responding to faults in a partitioned system having two tenants, according to various embodiments.

FIG. 2 is a schematic block diagram illustrating a system 200 for detecting and responding to faults in a partitioned system having two tenants, according to various embodiments. The system 200 includes a compute node 100, as described in FIG. 1, a first tenant 202, a second tenant 204, a computer network 206, a FPGA 208, remote resources 214 in the compute node 100, a pod 216 with a switch 218, remote hardware ("HW") resources 220, storage devices 222, a pod manager 224, and a workload orchestrator 226, which are described below.

In FIG. 2, in some embodiments, at least one of the partitions 112a, 112b is associated with a unique tenant 202, 204. In some embodiments, for example, a first tenant 202 is associated with a first partition 112a and a second tenant 204 is associated with a second partition 112b. In some embodiments, each of the first tenant 202 and the second tenant 204 is configured to communicate with its corresponding partition 112a, 112b via a computer network 206. The first and second tenants 202, 204, in some embodiments, are clients running on a server that access the first partition 112a, and second partition 112b via the computer network 206.

In some embodiments, the management controller 104 includes a fault monitor apparatus 106 configured to monitor a partition state for each of the partitions 112a, 112b. In some embodiments, each of the partitions 112a, 112b includes a CPU 114 executing an instance of an operating system. As discussed in more detail below, the fault monitor apparatus 106 may be configured to detect a fault in the first partition 112a and/or the second partition 112b and to determine an appropriate response to the detected fault in view of their shared components.

In some embodiments, the fault monitor apparatus 106 receives partition state information from the operating system of each partition 112a, 112b, where each of the partitions 112a, 112b includes operating system monitoring, sensors, circuits, and other equipment, data structures, etc. capable of providing partition state information. In some embodiments, partition state information is in the form of a fault and the fault monitor 106 determines an appropriate response in response to the fault. A fault may include events related to hardware components, software, processes, or the like that is indicative of a change that has occurred in the partition state of at least one of the partitions 112a, 112b. In some embodiments, the partition state information includes an error message, such as an error message sent to an event log.

In some embodiments, determining that there is a fault in the partition state includes determining that a monitored value exceeds a predetermined threshold value. The monitored value may include a voltage, a current, a temperature, or the like. The monitored value may be from a power supply, a CPU 114, a compute node 100, memory 116, a storage device, or any other device or resource 118 in a partition 112a, 112b that includes an ability to monitor a parameter and compare the parameter to the predetermined threshold value.

In other embodiments, determining that a change has occurred in the system state includes the fault monitor apparatus 106 receiving a notification associated with the operating system, such as read errors, write errors, process errors, a process execution malfunction, a warning regarding memory availability, or any other notification generated by an executing operating system. In some embodiments, the notification is a predictive failure alert ("PFA"). A predictive failure alert typically monitors one or more parameters and includes one or more thresholds representative of an indication that a failure of a component is likely to occur in the near future. In other embodiments, the notification is of a failure of a hardware component of one or both of the partitions 112a, 112b.

In other embodiments, the notification is of an input/output error associated with input/output signals of a selected partition 112a, 112b. In other embodiments, the notification is of a processing error associated with a processor of the selected partition 112a, 112b. In other embodiments, the notification is of a crossing of a threshold where the crossing of the threshold is indicative of a problem within the selected partition 112a, 112b.

In some embodiments, the fault monitor apparatus 106 monitors sensors, data lines, etc. that are specifically placed for use by the fault monitor apparatus 106. In some embodiments, the fault monitor apparatus 106 is configured to monitor various components of each partition 112a, 112b, such as the CPU 114, memory 116, various resources 118, etc. In some embodiments, the fault monitor apparatus 106 monitors one or more workloads running on each of the partitions 112a, 112b.

In some embodiments, the fault monitor apparatus 106 reports faults as they occur. In other embodiments, the fault monitor apparatus 106 reports faults within a window of time. In other embodiments, the fault monitor apparatus 106 or operating system counts certain events and reports the events when a count reaches a threshold during the window of time. In other embodiments, the fault monitor apparatus 106 stores faults in memory, which may be volatile memory or non-volatile memory. In other embodiments, the fault monitor apparatus 106 overwrites faults outside of the window of time.

In some embodiments, the fault monitor apparatus 106 interacts with the operating system ("OS") of each partition 112a, 112b to collect partition state data. In other embodiments, the fault monitor apparatus 106 uses circuits, data, etc. separate from the OS of a partition 112a, 112b to collect partition state data. In some embodiments, the fault monitor apparatus 106 monitors the system state of the two or more partitions 112a, 112b using firmware running on the two or more partitions 112a, 112b.

In some examples, the fault monitor apparatus 106 interacts with a Unified Extensible Firmware Interface ("UEFI") firmware or Basic Input/Output System ("BIOS") boot firmware. UEFI firmware and BIOS boot firmware support a compute node 100 or other computing device at a low level and help boot an operating system, monitor functions, processes, etc. UEFI is a publicly available specification that defines a software interface between an operating system and platform firmware and replaces legacy BIOS boot firmware. UEFI, and to a lesser degree BIOS, support remote diagnostics and repair of computing devices with or without an operating system.

In other embodiments, the fault monitor apparatus 106 monitors the partition state of each of the two or more partitions 112a, 112b using a management controller 104 of a compute node 100 or similar computing device. The management controller 104, in some embodiments, is connected to a management server over a management network. In some embodiments, the management controller 104 includes a baseboard management controller ("BMC"). In other embodiments, the management controller 104 is a datacenter secure control module ("DC-SCM"), which is discussed in detail with reference to FIG. 3 below. In some embodiments, the fault monitor apparatus 106 monitors one or more components of each of the two or more partitions 112a, 112b. In other embodiments, the fault monitor apparatus 106 monitors a portion of each of the two or more partitions 112a, 112b. One of skill in the art will recognize other ways for the fault monitor apparatus 106 to monitor for faults of each of the two or more partitions 112a, 112b.

In some embodiments, the partitions 112a, 112b to be monitored as well as what changes indicate a fault in a partition (e.g., 112a) are configurable by a user via a graphical user interface. In other embodiments, the fault monitor apparatus 106 is configurable by a user to set thresholds and the fault monitor apparatus 106 is configurable to set logic, a hierarchy, etc. for the various thresholds. In other embodiments, the graphical user interface allows a user to determine which components, processes, workloads, etc. to monitor for partition state information. One of skill in the art will recognize other thresholds, notifications, error messages, etc. to be monitored and used by the fault monitor apparatus 106.

In some embodiments, a field programmable gate array ("FPGA") 208 facilitates partitioning a compute node 100 into partitions 112a, 112b. The FPGA 208, in some embodiments, partitions the compute node 100 so that each partition 112a, 112b includes a CPU 114, memory 116, resources 118, etc. The FPGA 208, in some embodiments, configures the compute node 100 to remove one or more partitions 112a, 112b. In some embodiments, the FPGA 208 facilitates communication between the fault monitor apparatus 106 and the partitions 112a, 112b. In various embodiments, the FPGA 208 differs from a remote hardware resource 220 that is an FPGA used for execution of workloads.

In some embodiments, a workload orchestrator 226 coordinates execution of workloads on partitions 112a, 112b of one or more compute nodes 100. In some embodiments, the workload orchestrator 226 coordinates with the FPGA 208 to create partitions 112a, 112b that include virtual machines ("VMs"), containers, etc. for various tenants 202, 204 in communication with the one or more compute nodes 100 and partitions 112a, 112b over a computer network 206.

In some embodiments, the partitions 112a, 112b also include at least one remote resource 214 which emulates a remote hardware resource 220 located external to the compute node 100. The remote hardware resources 220, in some embodiments are in a pod 216 that includes various remote resources 214, such as accelerators, FPGAs, storage devices, CPUs, GPUs, and the like. The pod 216 typically includes a switch 218 configured to connect the remote hardware resources 220 to compute nodes 100 as directed by a pod manager 224. The fault monitor apparatus 106 is configured, in some embodiments, to monitor faults of a remote hardware resource 220 that is emulated by a remote resource 214 of a partition 112a, 112b.

In some embodiments, the compute nodes 100 include multiple sockets that each accommodate a CPU 114 where each CPU 114 is supported by memory 116 and other components. A common configuration of a compute node 100 includes two sockets 110a, 110n, as depicted in FIG. 1.

The compute nodes 100 communicate with an associated tenant 202, 204, respectively, over a computer network 206 that may include a LAN, a WAN, a fiber network, a wireless connection, the Internet, etc. and may include multiple networks. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 3:
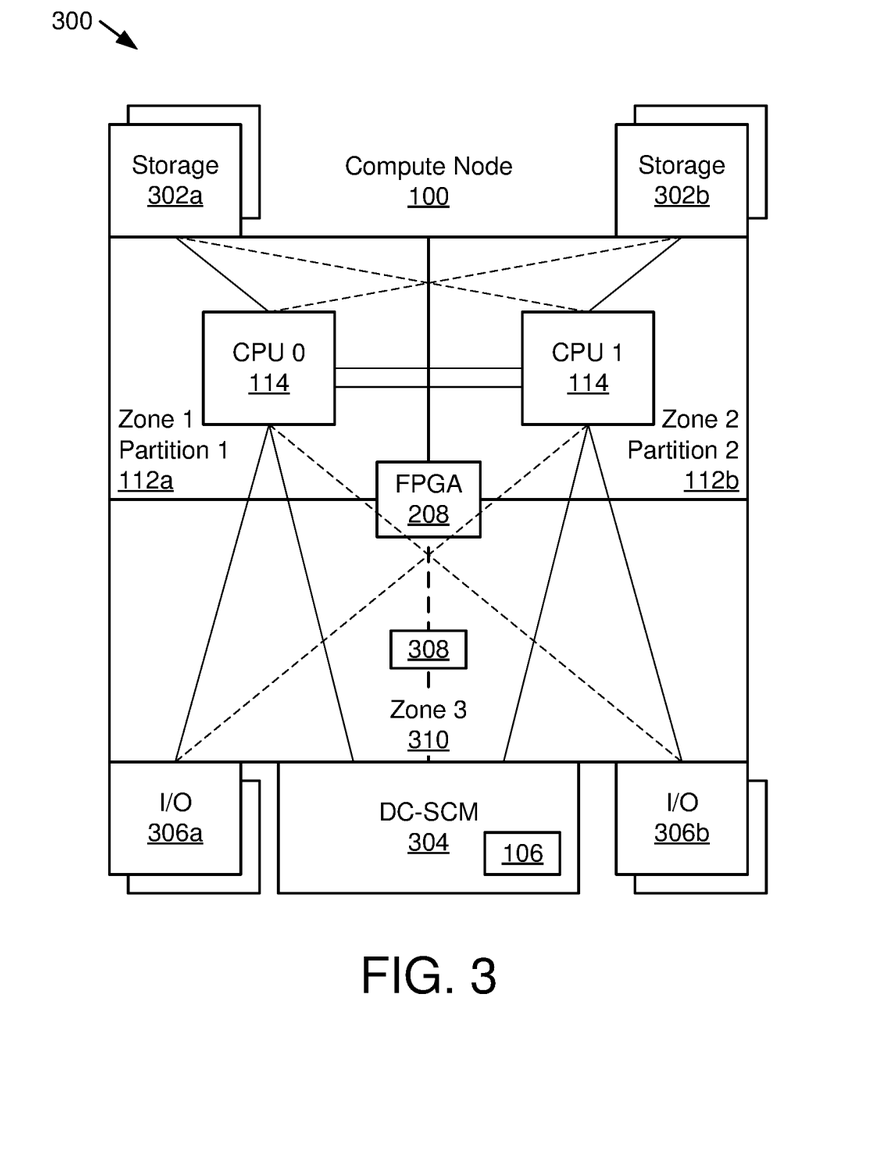
FIG. 3 is a schematic block diagram illustrating another system for monitoring partitions for faults where the partitions are in a partitioned compute node, according to various embodiments.

FIG. 3 is a schematic block diagram illustrating another embodiment of a system 300 for detecting and appropriately responding to faults in a partitioned system, where the partitions 112a, 112b are in a partitioned compute node 100, according to various embodiments. In some embodiments, the partitions 112a, 112b are in a composable system. The system 300 includes a compute node 100 having a management controller 104 and a fault monitor apparatus 106 substantially similar to those described above in relation to the systems 100, 200 of FIGS. 1 and 2. In the embodiments of the system 300 of FIG. 3, the management controller 104 is in the form of a datacenter secure compute module ("DC-SCM") 304 and includes the fault monitor apparatus 106.

In the depicted embodiments, the fault monitor apparatus 106 is connected to each of two partitions 112a, 112b. The system 300 includes two partitions 112a, 112b, labeled zone 1 and zone 2, which are substantially similar to those described above in relation to the system 200 of FIG. 2. Each partition 112a, 112b includes a CPU 114, memory 116, and a resource 118 as in the system 200 of FIG. 2. The partitions 112a, 112b may also include other installed resources 118. The compute node 100 also includes a zone 3 310 which includes an I/O switch 308. In some embodiments, zone 3 310 is partitionable into one or two parts, depending on whether or not I/O devices 306a, 306b are separated to service each of the first partition 112a and the second partition 112b or if the I/O switch 308 is used to connect to a single partition 112a, 112b at a time. In some embodiments, the I/O switch 308 is a keyboard, video, mouse ("KVM") switch. The I/O switch 308, in some embodiments, includes various controllers, such as a GPU, a universal serial bus ("USB") controller, etc. In other embodiments, the I/O switch 308 switches I/O signals and another device includes I/O controllers, a GPU, etc.

The fault monitor apparatus 106 may be configured to monitor the I/O switch 308. In some embodiments, the I/O switch 308 is configured to switch input of the I/O switch 308 to send data for display of one or more elements of the selected partition (e.g., 112a) to an electronic display, for example.

The system 300 of FIG. 3 includes a DC-SCM 304. The DC-SCM 304 is a management controller 104 compliant with an open source specification. The DC-SCM 304 complies with a DC-SCM specification, such as the DC-SCM 2.0 specification. The DC-SCM 304, in some embodiments, includes a baseboard management controller ("BMC") and is connected to a management network. Typically, a DC-SCM 304 includes a BMC plus other supporting components, such as memory, buses, bus controllers, a GPU, and the like. In some embodiments, the DC-SCM 304 is a card in a dedicated slot on a motherboard of the compute node 100 where the slot complies with a DC-SCM specification.

As described above, the management network, in some embodiments, is a network different than the computer network 206 used for communication with clients, tenants 202, 204, etc. for communication of data from workloads running on the compute node 100, etc. In other embodiments, the management network uses a same computer network 206 as is used for data from workloads but runs securely.

In some embodiments, the fault monitor apparatus 106 is distributed between a motherboard 102 of the compute node 100 and the DC-SCM 304. In some examples, one or more I/O switches 308 are on the motherboard 102 and the fault monitor apparatus 106 is in the DC-SCM 304. In other embodiments, components of the fault monitor apparatus 106 are distributed differently.

In the embodiments of FIG. 3, the compute node 100 is connected to other devices, such as storage 302a, 302b, I/O devices 306a, 306b, which may be installed through cables, in slots, etc. The storage 302a, 302b, I/O devices 306a, 306b, etc., in some embodiments, are situated to service each CPU 114 when partitioned. In other embodiments, I/O devices 306a, 306b, such as an electronic display, keyboard, mouse, etc. are connected through the DC-SCM 304, either locally or remotely, to provide system administrator access to the compute node 100 and partitions 112a, 112b of the compute node 100.

Figure 4:
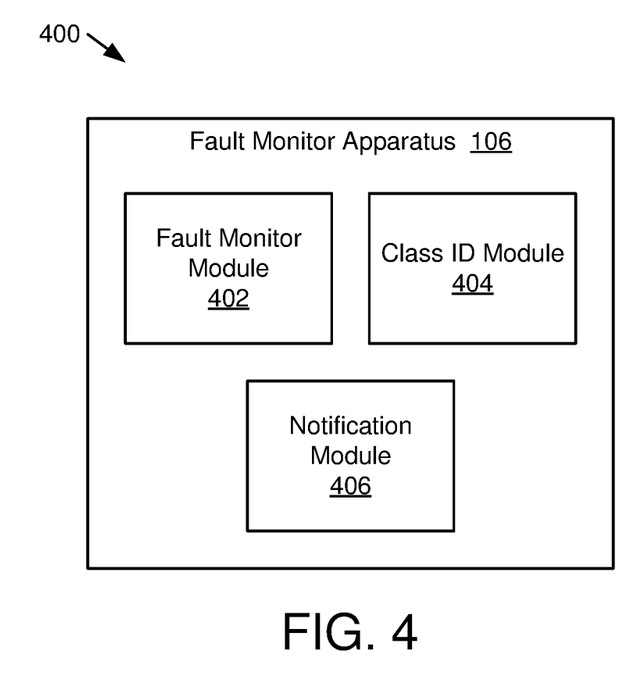
FIG. 4 is a schematic block diagram illustrating an apparatus for monitoring and responding to faults in a partitioned system, according to various embodiments.

FIG. 4 is a schematic block diagram illustrating an apparatus 400 for monitoring and responding to faults in a partitioned system 100, 200, 300, according to various embodiments. The apparatus 400 includes a fault monitor 106 with a fault monitor module 402, a class identifier ("ID") module 404, and a notification module 406, which are described below. In some embodiments, the fault monitor 106 monitors two or more partitions 112a, 112b for faults. The fault monitor apparatus 106 may be located in a management controller 104, in a DC-SCM 304, on a motherboard 102 of a compute node 100, or the like. In some embodiments, the apparatus 400 is implemented using code stored on a computer readable storage media. The code is executable on a processor. In other embodiments, all or a portion of the apparatus 400 is implemented using hardware circuits and/or a programmable hardware device.

In some embodiments, the apparatus 400 includes a fault monitor module 402 configured to monitor, for faults, each of two or more partitions 112a, 112b in a partitioned system 200. The partitions 112a, 112b share a management controller 104 and each of the partitions 112a, 112b is associated with a tenant 202, 204. In various embodiments, the fault monitor module 402 monitors the partitions 112 for faults as described above in relation to the system 200 of FIG. 2. In some embodiments, the fault monitor module 402 detects faults based on information sent by the partitions 112 to the management controller 104 or DC-SCM 304. In other embodiments, the fault monitor module 402 is configured to receive fault information from an FPGA 208 relaying information from the partitions 112. The various types of faults that may be monitored by the fault monitor module 402 are described above.

The fault monitor module 402 is also configured to detect a fault on a first partition 112a of the two or more partitions 112a, 112b. The fault may include, for example, a power fault, a thermal event, a hardware component failure, a catastrophic software error, and/or the like. The detected fault may physically impact a partition 112a, 112b different than the partition 112a, 112b where the detected fault occurred.

Figure 6:
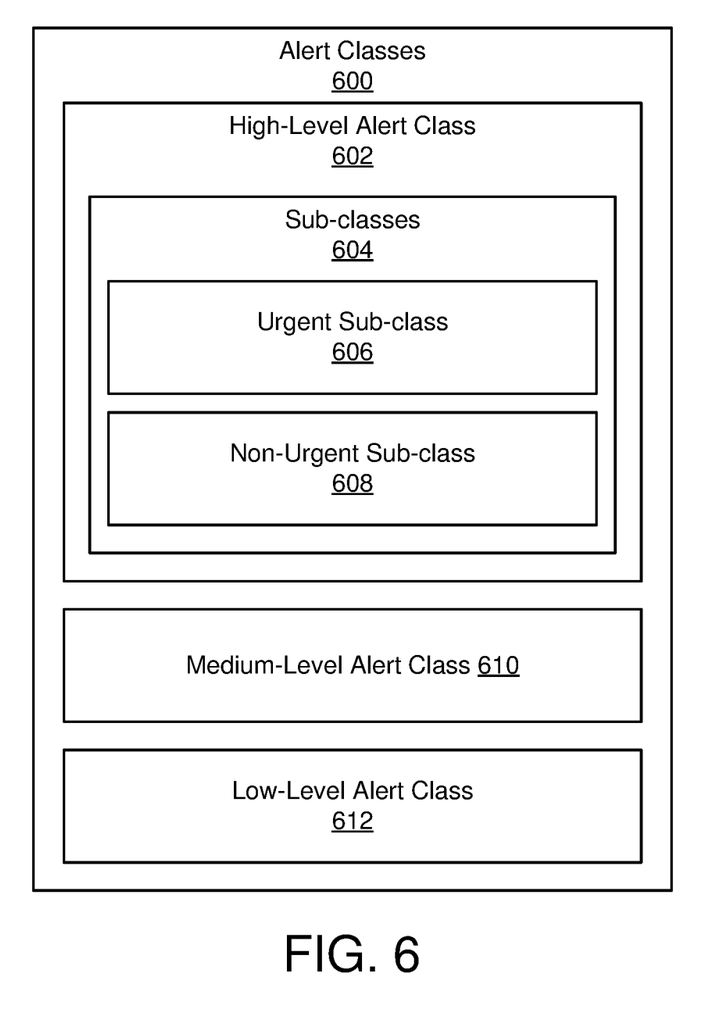
FIG. 6 is a schematic block diagram illustrating a plurality of alert classes, according to various embodiments.

The apparatus 400 includes a class identification module 404 configured to identify an alert class of a plurality of alert classes 600. The alert class corresponds to the detected fault. In some embodiments, multiple alert classes 600 correspond to one or more faults. In some embodiments, as shown in FIG. 6, the alert classes 600 are hierarchically arranged to include a high-level alert class 602, a medium-level alert class 610, and a low-level alert class 612. The high-level alert class 602 indicates that the fault affects at least one partition 112a, 112b other than the partition 112a, 112b in which the fault occurred. In some embodiments, the medium-level alert class 610 indicates that the fault affects only the partition 112a, 112b in which the fault occurred. In certain embodiments, the low-level alert class 612 indicates that the fault is not a significant problem and affects only the partition 112a, 112b in which the fault occurred.

In certain embodiments, one or more of the alert classes 600 is associated with one or more sub-classes 604. Each sub-class 604 may identify a remediation action corresponding to the fault and/or a response time within which the remediation action must be performed. In some embodiments, the high-level alert class 602 includes multiple sub-classes 604 where each sub-class (e.g., 606, 608) of the plurality of sub-classes 604 is related to a response time within which a remediation action must be performed and the class identification module 404 is configured to identify an alert sub-class 604 corresponding to the detected fault in response to identifying that the alert class 600 of the fault is a high-level alert class 602. In some embodiments, the sub-classes 604 include an urgent sub-class 606 to identify faults associated with a remediation action that must be performed immediately. In some embodiments, the sub-classes 604 include a non-urgent sub-class 608 to identify faults associated with a non-urgent remediation action that may be scheduled for a future time. In some embodiments, the sub-classes 604 of the high-level alert classes 602 include other sub-classes 604 not depicted in FIG. 6 associated with other remediation timing. In certain embodiments the non-urgent sub-class 608 identifies a fault that may be simply logged or recorded.

The alert classes 600 of FIG. 6 are only illustrative of some embodiments of alert classes 600. The fault detection apparatus 106 described herein contemplates other fault classes, types, etc. and is configured to identify faults that affect more than one partition 112 of a partitionable system 100, 200, 300. One of skill in the art will recognize various alert classes that affect more than one partition 112.

The class identification module 404 is also configured to identify that the alert class of the fault is a high-level alert class 602 where the high level alert class indicates that the fault affects one or more other partitions (e.g., 112b) of the two or more partitions 112a-112n different than the first partition 112a. In other embodiments, the class identification module 404 identifies that the detected fault is a medium-level alert class 610 or a low-level alert class 612.

The apparatus 400 includes a notification module 406 configured to notify the tenant 202 of the first partition 112a and each tenant of the one or more other partitions (e.g., 112b-112n) of the fault in response to the alert class being the high-level alert class. While the examples described herein include the fault occurring in the first partition 112a, other embodiments are contemplated where the fault occurs in any of the other partitions 112b-112n and the notification module 406 notifies partitions 112 where the fault did not occur when the alert class corresponds to a high-level alert class 602 affecting more than one partition 112. In some embodiments, the notification module 406 is configured to notify one or more tenants 204 of other partitions 112a, 112b if fault monitor apparatus 106 determines that the fault is likely to affect any partitions 112a, 112b other than the first partition 112a. In some embodiments, the notification module 406 notifies the tenant 202 of the first partition 112a and the tenants 204 of the additional partitions 112b if the identified alert class 600 is a high-level alert class 602. In some embodiments, the notification module 406 notifies the tenants 204 of the other partitions 112b via the management controller 104. In some embodiments, the management controller 104 communicates with the tenants 202, 204 via a management network. In other embodiments, the notification module 406 notifies partitions 112 using a communication channel other than the management network.

Figure 5:
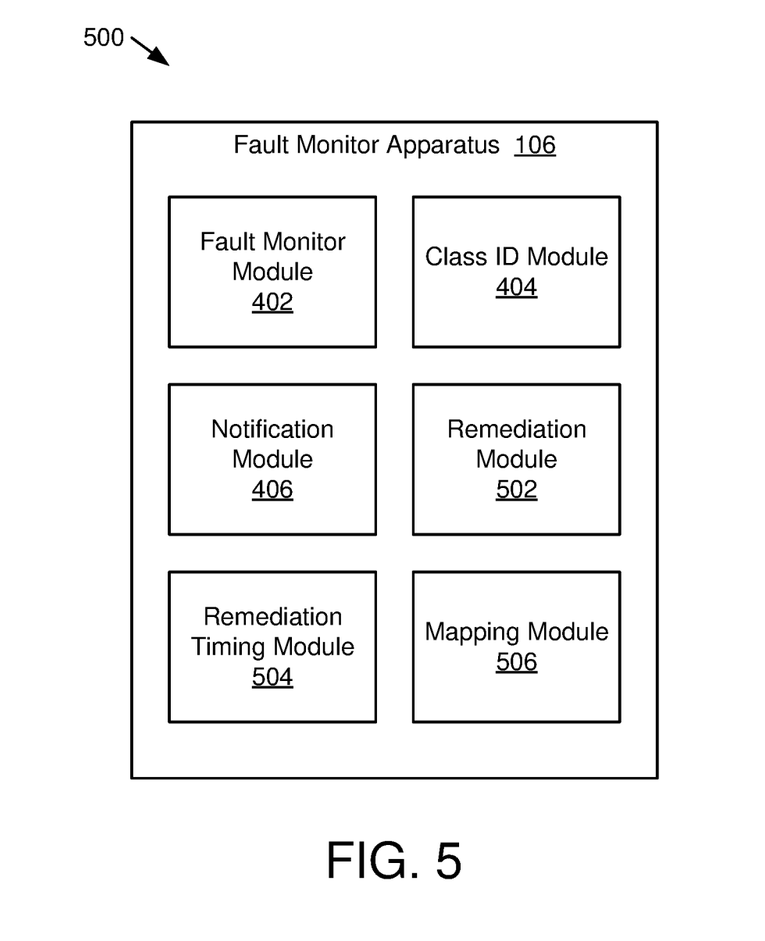
FIG. 5 is a schematic block diagram illustrating another apparatus for monitoring and responding to faults in a partitioned system, according to various embodiments.

FIG. 5 is a schematic block diagram illustrating another apparatus 500 for monitoring and responding to faults in a partitioned system 100, 200, 300, according to various embodiments. The apparatus 500 includes another fault monitor apparatus 106 that includes a fault monitor module 402, a class identification module 404, and a notification module 406, which are substantially similar to those describe above in relation to the apparatus 400 of FIG. 4. In various embodiments, the fault monitor apparatus 106 includes a remediation module 502, a remediation timing module 504, and/or a mapping module 506, which are described below. In some embodiments, the apparatus 500 is implemented similar to the apparatus 400 of FIG. 4.

In some embodiments, the apparatus 500 includes a remediation module 502 configured to identify a remediation action to be performed and/or timing of the remediation action based on the identified alert class 600 of the detected fault. In some embodiments, the remediation module 502 further identifies one or more remediation actions associated with each sub-class 604. Remediation actions may include, for example, logging the fault, moving data, shedding load, refusing critical loads, and/or redirecting new data to a non-shared drive.

In some embodiments, the remediation actions are designed to prepare a partition (e.g., 112b) based on faults with alert classes that affect partitions (e.g., 112b-112n) different than the partition 112a where the fault occurred. For example, where the fault is of a type where the entire motherboard 102 of a compute node 100 is shut down, remediation actions for the non-fault partitions 112b-112n may require shedding load, refusing workloads, moving data, or other actions commensurate with shutting down the non-fault partitions 112b-112n. In other embodiments, the fault may be associated with a first storage device 222a that is used by the first partition 112a where the fault was detected as well a second partition 112b so that a remediation action affects the second partition 112b. The remediation action may then be to move data used by the second partition 112b to a second storage device 222b in preparation for a remediation action affecting the first storage device 222a.

In other examples, the detected fault of the first partition 112a may include rebooting the compute node 100, which affects the other partitions 112b-112n so that the remediation module 502 is configured to take remediation actions on the other partitions 112b-112n in preparation for the reboot. In other examples, the fault detected on the first partition 112a may involve a power supply providing power to the first partition 112a as well as to one or more of the other partitions 112b-112n so that the remediation module 502 includes remediation actions for the other partitions 112b-112n in addition to remediation actions for the first partition 112a. One of skill in the art will recognize other remediation actions for the other partitions 112b-112n in addition to remediation actions for the first partition 112a where the fault occurred.

In various embodiments, the remediation actions for the various alert classes 600 and sub-classes 604 are appropriate for the detected fault. In some embodiments, the remediation action is more than the notifications transmitted by the notification module 406. In some embodiments, the remediation module 502 initiates the remediation action for a particular fault automatically without intervention of a system administrator or other user. In other embodiments, the remediation module 502 initiates remediation actions after approval by a system administrator or user where the remediation module 502 may work in conjunction with the notification module 406 to identify a remediation action in the notification sent to a system administrator or user.

In some embodiments, the apparatus 500 includes a remediation timing module 504 configured to associate a response time, response window, duration of time, etc. for response with each alert class 600 and/or sub-class 604. In some embodiments, the high-level alert class 602 includes an urgent sub-class 606 and a non-urgent sub-class 608. In some embodiments, the remediation timing module 504 requires immediate performance of a remediation action if the alert class 600 is a high-level alert class 602 with an urgent sub-class 606. In other embodiments, the remediation timing module 504 defers a remediation action where the alert class 600 is a high-level alert class 602 and the sub-class 604 is a non-urgent sub-class 608 or other sub-class 604 that is not urgent. For example, a non-urgent sub-class 608 may include a remediation action that occurs when a technician replaces a part, performs maintenance, or the like. In some embodiments, the remediation timing module 504 schedules some remediation action immediately, such as refusing critical workloads, while deferring other remediation actions, such as shedding all load until a later time, such as when a technician is about to replace a part, shut down the motherboard 102, or the like.

In certain embodiments, the remediation timing module 504 schedules performance of the remediation action immediately or for a future time for the first partition 112a where the fault occurred if the alert class 600 is a medium-level alert class 610 or a low-level alert class 612. In some embodiments, the medium-level alert class 610 and/or the low-level alert class 612 include sub-classes indicative of timing of remediation actions associated with the first partition 112a where the fault occurred. In some embodiments, the remediation timing module 504 is configured to change or move a scheduled future remediation time to an earlier time if a second fault is detected in one of the partitions 112a, 112b and the second fault belongs to the high-level alert class 602 and/or is of a nature where a remediation action should occur before a scheduled remediation action.

In some embodiments, the apparatus 500 includes a mapping module 506 configured to build a map of hardware components corresponding to the partitions 112a, 112b of a partitioned compute node 100. In some embodiments, the fault monitor apparatus 106 builds the map based on configuration mappings of each partition 112a, 112b. In some embodiments, the map includes hardware components shared between two or more of the partitions 112a, 112b. In some examples, two or more of the partitions e.g., 112a, 112b include one or more shared storage devices 222. In other embodiments, two or more buses or PCIe adapters are assigned to separate partitions 112a, 112b, but may share a PCIe riser card. In some embodiments, the fault monitor apparatus 106 defines the hierarchy of alert classes 600 based upon the map of hardware components.

Figure 7:
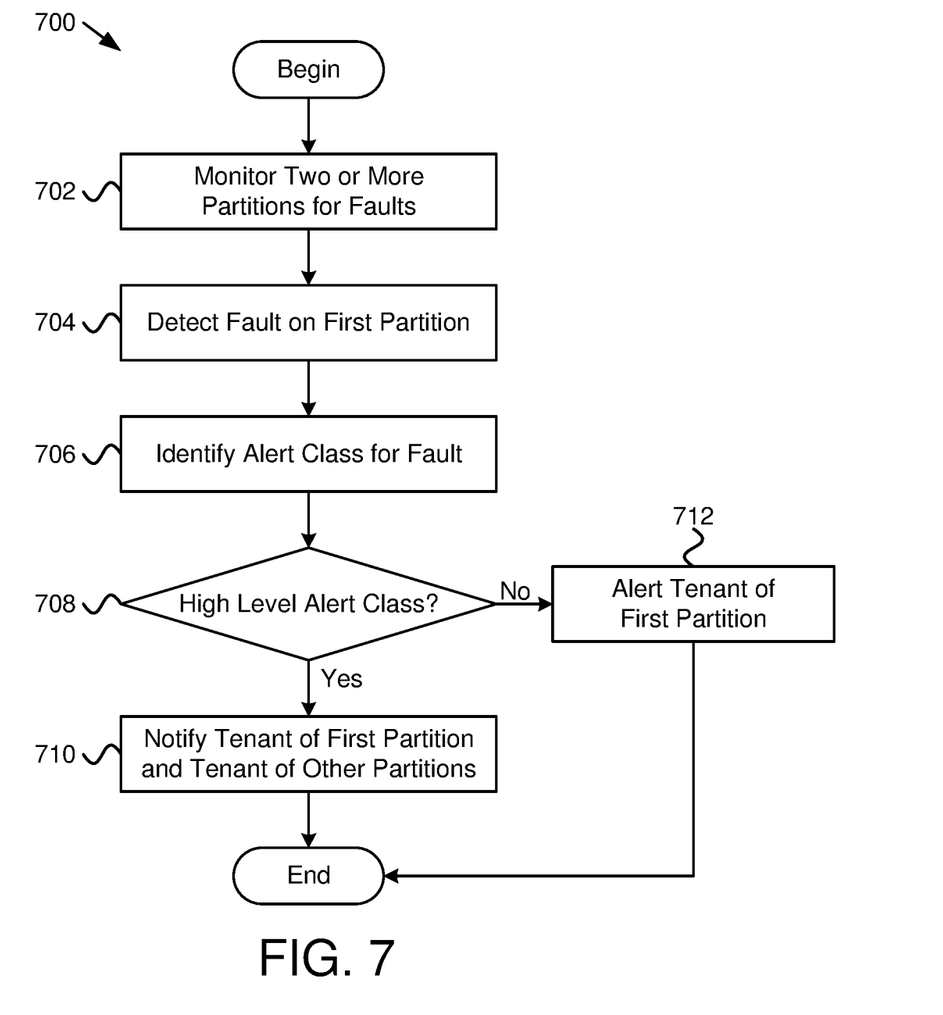
FIG. 7 is a schematic flow chart diagram illustrating one embodiment of a method for monitoring and responding to faults in a partitioned system, according to various embodiments.

FIG. 7 is a schematic flow chart diagram illustrating a method 700 for monitoring and responding to faults in a partitioned system 100, 200, 300 sharing a management controller 104 according to various embodiments. The method 700 begins and monitors 702, for faults, each of two or more partitions 112a-112n in a system 100, 200, 300 sharing a management controller 104 (or DC-SCM 304). In some embodiments, each of the two or more partitions 112a-112n includes a CPU 114 executing an instance of an operating system. Each partition 112a-112n is associated with a tenant 202, 204, etc.

The method 700 detects 704 a fault on a first partition 112a of the two or more partitions 112a-112n and identifies 706 an alert class 600 of a plurality of alert classes 600 for the fault. The method 700 determines 708 whether the alert class 600 is a high-level alert class 602. The high-level alert class indicates that the fault affects one or more other partitions e.g., 112b-112n of the two or more partitions 112a-112n different than the first partition 112a. If the method 700 determines 708 that that alert class 600 is a high-level alert class 602, the method 700 notifies 710 the tenant 202 of the first partition 112a and each tenant 204, etc. of the one or more other partitions 112b-112n of the fault, and the method 700 ends. If the method 700 determines 708 that the alert class 600 is not a high-level alert class 602, the method 700 alerts 712 the tenant 202 of the first partition 112a only, and the method 700 ends. In various embodiments, all or a portion of the method 700 is implemented using the fault monitor module 402, the class identification module 404, and/or the notification module 406.

Figure 8:
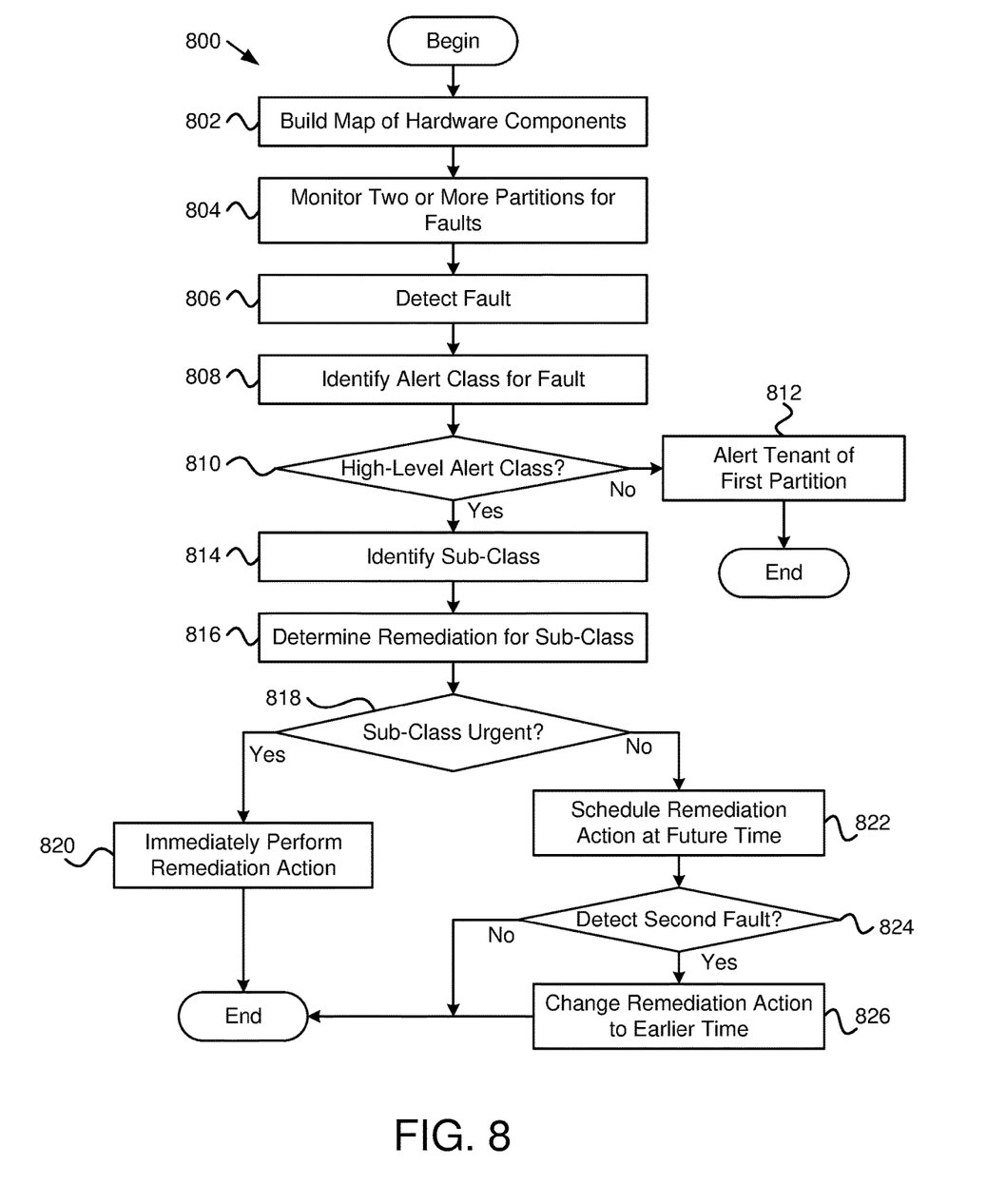
FIG. 8 is a schematic flow chart diagram illustrating another embodiment of a method for monitoring and responding to faults in a partitioned system, according to various embodiments.

FIG. 8 is a schematic flow chart diagram illustrating another method 800 for monitoring and responding to faults in a partitioned system 100, 200, 300 sharing a management controller 104 according to various embodiments. The method 800 begins and builds 802 a map of hardware components in a partitioned system 100, 200, 300. The method 800 monitors 804 two or more partitions 112a-112n for faults and detects 806 a fault in one of the partitions 112a-112n and identifies 808 an alert class 600 for the fault. The method 800 determines 810 if the alert class 600 is a high-level alert class 602. If the method 800 determines 810 that the alert class 600 is not a high-level alert class 602, the method 800 alerts 812 the tenant (e.g., 202) of the partition (e.g., 112a). corresponding to the fault, and the method 800 ends.

If the method 800 determines 810 that the alert class 600 is a high-level alert class 602, the method 800 identifies 814 a sub-class 604 corresponding to the fault and determines 816 at least one remediation action for the fault based on the sub-class 604. The method 800 determines 818 whether the sub-class 604 is an urgent sub-class 606. If the method 800 determines 818 that the sub-class 604 is an urgent sub-class 606, the method 800 immediately performs 820 the remediation action, and the method 800 ends. If the method 800 determines 818 that the sub-class 604 is a non-urgent sub-class 608, the method 800 schedules 822 the remediation action at a future time or within a future time frame.

The method 800 determines 824 whether a second fault is detected within the partitioned system 100, 200, 300, which may also include determining if the second fault also belongs to a high-level alert class 602. If the method 800 determines 824 that there is a second fault that is a high-level alert class 602, for some faults the method 800 changes 826 the scheduled time for performing the remediation action to an earlier time, or re-schedules the remediation action for immediate performance, and the method 800 ends. If the method 800 determines 824 that there is no fault that is a high-level fault before the scheduled remediation action, the method 800 ends after the remediation action. In various embodiments, all or a portion of the method 800 is implemented using the fault monitor module 402, the class identification module 404, the notification module 406, the remediation module 502, the remediation timing module 504, and/or the mapping module 506.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    monitoring, for faults, each of two or more partitions in a system sharing a management controller, wherein each of the two or more partitions is associated with a tenant;
    detecting a fault on a first partition of the two or more partitions;
    identifying an alert class of a plurality of alert classes for the fault;
    identifying that the alert class of the fault is a high-level alert class, the high-level alert class indicating that the fault affects one or more other partitions of the two or more partitions different than the first partition; and
    notifying the tenant of the first partition and each tenant of the one or more other partitions of the fault in response to the alert class being the high-level alert class.

2. The method of claim 1, wherein the high-level alert class comprises a plurality of sub-classes, wherein each sub-class of the plurality of sub-classes is related to a response time within which a remediation action must be performed, and further comprising identifying an alert sub-class corresponding to the fault in response to identifying that the alert class of the fault is a high-level alert class.

3. The method of claim 2, further comprising determining, based on the identified alert sub-class, a remediation action to be performed and/or timing of the remediation action.

4. The method of claim 3, wherein the remediation action comprises, for the first partition and the one or more other partitions, moving data, shedding load, refusing critical loads, and redirecting new data to a non-shared drive.

5. The method of claim 3, further comprising, based on the identified sub-class, immediately performing, at the first partition and/or the one or more other partitions, the remediation action associated with the sub-class.

6. The method of claim 3, further comprising, based on the identified sub-class, scheduling, at the first partition and/or the one or more other partitions, the remediation action associated with the sub-class for a future time.

7. The method of claim 6, wherein in response to the identified alert class comprising the sub-class for scheduling the remediation action at a future time and in response to detecting a second fault with an identified alert class comprising a high-level alert class, further comprising changing the scheduled remediation to an earlier time.

8. The method of claim 1, further comprising building a map of hardware components related to more than one of the two or more partitions, wherein identifying the alert class of the plurality of alert classes for the fault and identifying that the alert class is a high-level alert class further comprises accessing information from the map to determine if a component related to the fault is related to more than one of the two or more partitions.

9. The method of claim 1, wherein notifying the tenants of the one or more other partitions comprises communicating, over a management network, the fault to the tenants of the one or more other partitions via the management controller.

10. The method of claim 9, wherein the management controller communicates with the tenants of the one or more other partitions via one of two or more sockets of a common motherboard.

11. An apparatus comprising:
one or more processors; and
non-transitory computer readable storage media storing code, the code being executable by the one or more processors to perform operations comprising:
monitoring, for faults, each of two or more partitions in a system sharing a management controller, wherein each of the two or more partitions is associated with a tenant;
detecting a fault on a first partition of the two or more partitions;
identifying an alert class of a plurality of alert classes for the fault;
identifying that the alert class of the fault is a high-level alert class, the high-level alert class indicating that the fault affects one or more other partitions of the two or more partitions different than the first partition; and
notifying the tenant of the first partition and each tenant of the one or more other partitions of the fault in response to the alert class being a high-level alert class.

12. The apparatus of claim 11, wherein the high-level alert class comprises a plurality of sub-classes, wherein each sub-class of the plurality of sub-classes related to a response time within which a remediation action must be performed, and further comprising identifying an alert sub-class corresponding to the fault in response to identifying that the alert class of the fault is a high-level alert class.

13. The apparatus of claim 12, further comprising determining, based on the identified alert sub-class, a remediation action to be performed and/or timing of the remediation action.

14. The apparatus of claim 13, further comprising, based on the identified sub-class, one of:

immediately performing, at the first partition and/or the one or more other partitions, the remediation action associated with the sub-class; and
scheduling, at the first partition and/or the one or more other partitions, the remediation action associated with the sub-class for a future time.

15. The apparatus of claim 14, wherein in response to the identified alert class comprising the sub-class for scheduling the remediation action at a future time and in response to detecting a second fault with an identified alert class comprising a high-level alert class, further comprising changing the scheduled remediation to an earlier time.

16. The apparatus of claim 11, further comprising building a map of hardware components related to more than one of the two or more partitions, wherein identifying the alert class of the plurality of alert classes for the fault and identifying that the alert class is a high-level alert class further comprises accessing information from the map to determine if a component related to the fault is related to more than one of the two or more partitions.

17. The apparatus of claim 11, wherein notifying the tenants of the one or more other partitions comprises communicating, over a management network, the fault to the tenants of the one or more other partitions via the management controller.

18. A system comprising:
a partitionable motherboard with two or more partitions;
a management controller configured to communicate with the two or more partitions, the management controller connected to tenants of the two or more partitions over a management network;
one or more processors on the management controller; and
non-transitory computer readable storage media storing code, the code being executable by the one or more processors to perform operations comprising:
monitoring, for faults, each of two or more partitions in a system sharing a management controller, wherein each of the two or more partitions is associated with a tenant;
detecting a fault on a first partition of the two or more partitions;
identifying an alert class of a plurality of alert classes for the fault;
identifying that the alert class of the fault is a high-level alert class, the high-level alert class indicating that the fault affects one or more other partitions of the two or more partitions different than the first partition; and
notifying the tenant of the first partition and each tenant of the one or more other partitions of the fault in response to the alert class being a high-level alert class.

19. The system of claim 18, wherein the high level alert class comprises a plurality of sub-classes, wherein each sub-class of the plurality of sub-classes related to a response time within which a remediation action must be performed, and further comprising identifying an alert sub-class corresponding to the fault in response to identifying that the alert class of the fault is a high level alert class.

20. The system of claim 19, further comprising determining, based on the identified alert sub-class, a remediation action to be performed and/or timing of the remediation action.

* * * * *